United States Patent [19]

Van Luyt

[11] Patent Number: 4,914,515
[45] Date of Patent: Apr. 3, 1990

[54] METHOD OF TRANSMITTING UPDATE INFORMATION FOR A STATIONARY VIDEO PICTURE

[75] Inventor: Balthasar A. G. Van Luyt, Eindhoven, Netherlands

[73] Assignee: U.S. Philips Corporation, New York, N.Y.

[21] Appl. No.: 275,709

[22] Filed: Nov. 25, 1988

Related U.S. Application Data

[63] Continuation of Ser. No. 38,807, Apr. 15, 1987, abandoned.

[30] Foreign Application Priority Data

Apr. 18, 1986 [NL] Netherlands ............... 8600980

[51] Int. Cl.⁴ ............................................. H04N 7/04
[52] U.S. Cl. ..................................... 358/141; 358/136; 358/345
[58] Field of Search ................ 358/141, 133, 136, 22, 358/85, 342, 345

[56] References Cited

U.S. PATENT DOCUMENTS

| | | | |
|---|---|---|---|
| 4,027,331 | 5/1977 | Nicol | 358/136 |
| 4,150,397 | 4/1979 | Russel | 358/136 |
| 4,633,506 | 12/1986 | Kato | 358/22 |

OTHER PUBLICATIONS

Matsui et al., "High Speed Transmission of Sequential Freeze-Pictures by Extracting Changed Areas", IEEE Transactions, vol. Com-29, No. 12, pp. 1977-1981, 12/81.

Primary Examiner—James J. Groody
Assistant Examiner—David E. Harvey
Attorney, Agent, or Firm—Algy Tamoshunas; Leroy Eason

[57] ABSTRACT

Finite audio and video signals are subjected to some digitalizing encoding format and converted into blocks of audio and video words, respectively. For transmission of these blocks via a compact disc, the words are arranged in packets. Each packet has a packet header and a data field. Such a data field comprises either only audio words or only video words. The packet heater indicates whether the associated data field comprises audio or video words. In order to transmit only changes in the picture in the case of, inter alia, quasi-stationary pictures, each block of video words is divided into a number of sub-blocks and an operational code is added to the beginning of each sub-block. This defines, inter alia, picture elements and the sub-block itself gives video words for these pictures elements.

13 Claims, 3 Drawing Sheets

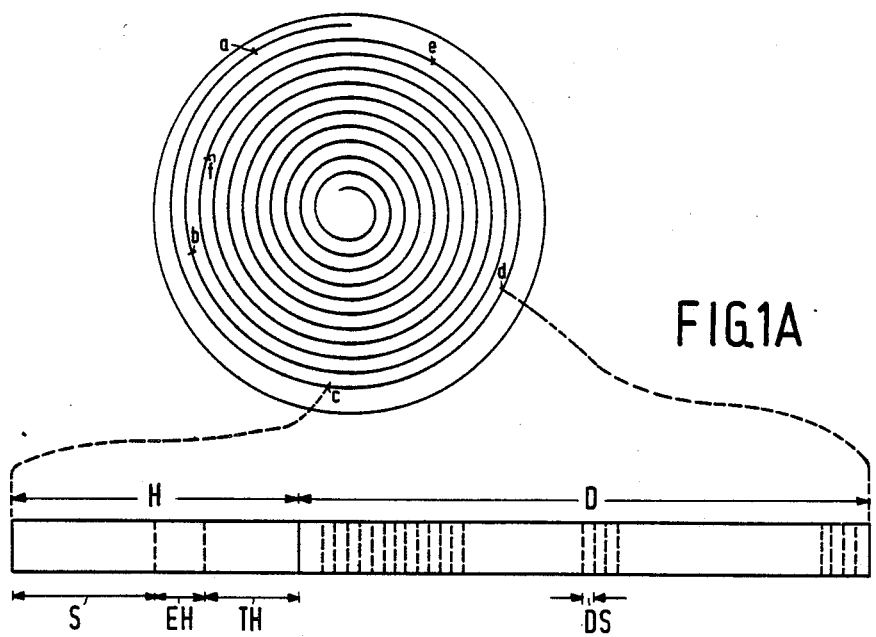
FIG.1A
FIG.1B
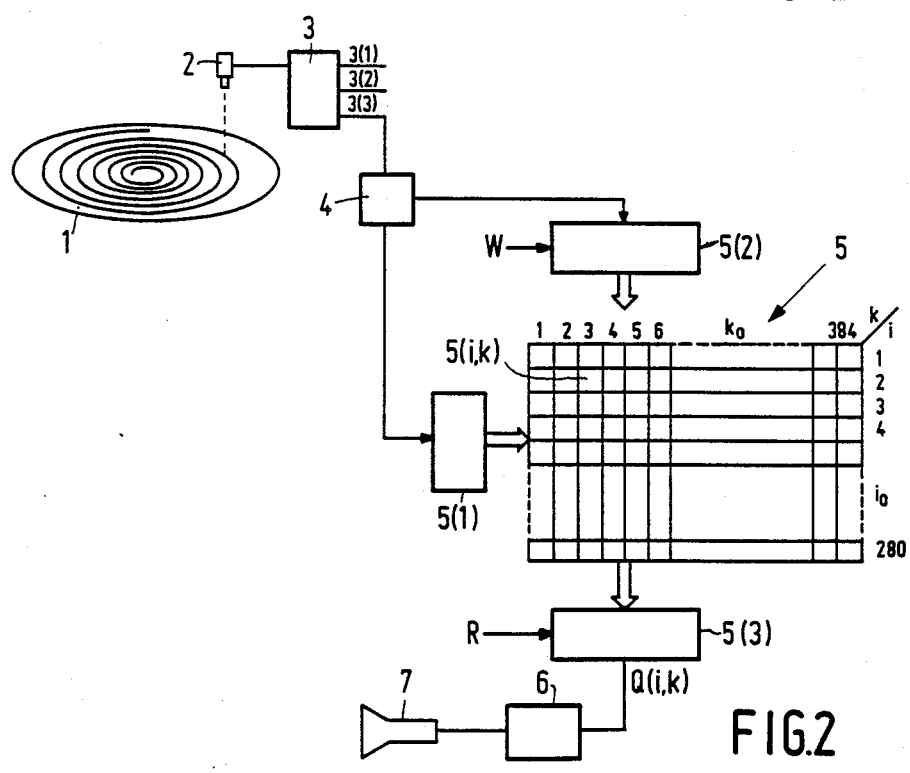
FIG.2

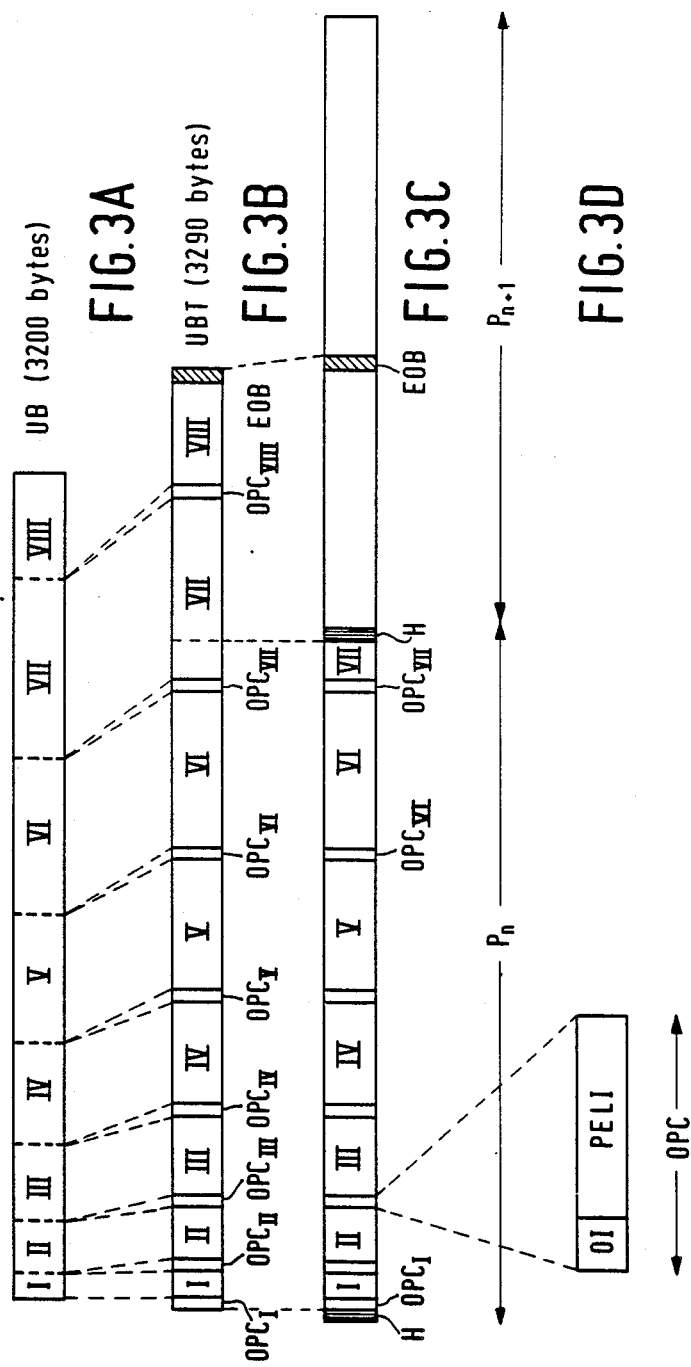

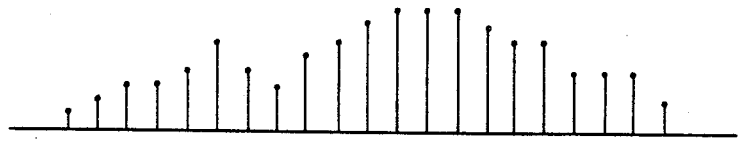
FIG. 4A
FIG. 4B
FIG. 4C
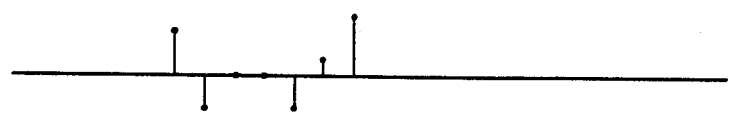
FIG. 4D
FIG. 4E
FIG. 4F
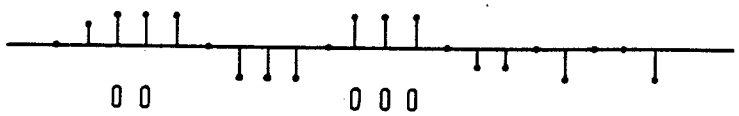
FIG. 4G

METHOD OF TRANSMITTING UPDATE INFORMATION FOR A STATIONARY VIDEO PICTURE

This is a continuation of application Ser. No. 038,807, filed Apr. 15, 1987, now abandoned.

BACKGROUND OF THE INVENTION

1. Field of the Invention

The invention generally relates to a method of transmitting stationary pictures, via a transmission medium having a very limited capacity, to a user for display of said pictures on the display screen of a monitor. The invention more particularly relates to a method of transmitting such pictures via a digital transmission medium, such as a compact disc or the like.

2. Description of the Prior Art

As is generally known, the compact disc is a digital storage medium which can store a given number of bits. The use of the compact disc as a transmission medium for 16 bit PMC encoded audio signals has been known for some years. A second use for the compact disc was in data ROM applications for data processing equipment. A third use is now being developed, namely as a transmission medium for digitalised video signals of quasi-stationary pictures which are accompanied by digitalised audio and possibly computer data.

In order to be able to transmit such a quasi-stationary picture via this transmission medium, the picture is divided into a number of lines (for example 280) and each line is in turn divided into a number of contiguous picture elements (for example, 384). Each picture element is assumed to have a uniform luminance and a uniform colour. A picture element, or "pixel," is fully defined by a number of picture characteristics or components; namely the luminance component $Y(i, k)$ and the two colour difference components $U(i, k)$ and $V(i, k)$ or, which is the same, the three primary colour components $R(i, k)$, $G(i, k)$ and $B(i, k)$. In this case i indicates the ordinal number of the line and k indicates the ordinal number of the picture element on this line (column).

Each picture component of a picture element is subjected to an encoding operation so that a uniform information word is obtained for each picture element, which will hereinafter be referred to as a video word. When PCM encoding is used, the picture components of each picture element are separately encoded; that is to say, independent of corresponding picture components of other picture elements. However, when the picture components are subjected to a DPCM encoding, basically only the difference between the corresponding picture components of each pair of two consecutive picture elements is subjected to a PCM encoding. Since the encoding of such a difference generally requires fewer bits than the encoding of each of the separate picture components, 4-bit DPCM encoding is adequate for each of the picture components for the envisaged novel use of the compact disc. This means that each picture element is characterized by a 12-bit video word.

To utilize the capacity of the transmission medium as economically as possible, the entire block of $280 \times 384$ video words is transmitted only once. The monitor has a picture memory which has at least as many memory locations as the number of picture elements in the picture. A picture element is uniquely associated with each memory location and such a memory location stores the transmitted video word of the relevant picture element. This picture memory is repeatedly read in the conventional manner in order to obtain the relevant picture on the display.

It is to be noted that it has been found to be unnecessary in practice to transmit both the luminance component and the two colour difference components of each picture element. It is sufficient to transmit the luminance component of each picture element and to transmit alternately the colour difference component U and the colour difference component V of successive picture elements. This means that each picture element can be characterized by an 8-bit video word. More particularly, the first four bits of this video word represent the luminance component of the picture element in DPCM format and the other four bits represent one of the two (alternating) colour difference components, likewise in DPCM format. The assembly of video words to be transmitted together defining a given stationary picture will hereinafter be referred to as a video block.

In the now envisaged novel use of the compact disc, a video block is accommodated in packets for transmission, and likewise for the other digitalised information constituents, sound and computer data. Each packet comprises, for example, 2352 bytes and each packet is roughly divided into two fields, namely into a packet header consisting of 24 bytes and a data field of 2328 bytes. The last 280 bytes in the data field may be utilized for fault protection and correction of the other bytes in the data field. They are used, for example, when the packet comprises computer data.

The packet header comprises, inter alia, synchronisation bytes for byte and bit synchronisation but also indicates whether the data in the data field represent picture information or audio or computer data. In these cases they are referred to as a video packet, an audio packet, and a computer data packet, respectively. The data field of an audio packet comprises 1164 audio words of 16 bits each, while the data field of a video packet comprises 2328 video words of 8 bits each.

SUMMARY OF THE INVENTION

It is an object of the invention to provide a transmission method for quasi-stationary video pictures which makes possible a further reduction of the total amount of bits to be transmitted.

According to the invention, each video block is divided into a number of sub-blocks and an operational code defining a number of picture elements is added to the beginning of each sub-block; the sub-block comprising video words for the defined picture elements.

The significance of the invention will be evident when it is considered that in the prior art method described in the previous section the video words of all $384 \times 280$ picture elements of each new picture must be transmitted, even when the new picture is mainly the same as the previous picture. In accordance with the invention, in such cases the operational code can be used to indicate which picture (as represented by elements of the previous picture the associated video words) are to be changed, and the video words following this operational code are only the new video words.

BRIEF DESCRIPTION OF THE FIGURES

FIGS. 1A and 1B diagrammatically show a compact disc with a track and the partition of the track into packets;

FIG. 2 diagrammatically shows the structure of a receiver for processing the signals supplied by the compact disc;

FIG. 3 shows how a block of video words for the purpose of an update is accommodated in packets;

FIG. 4 diagrammatically shows which information in the data field must be transmitted in the case of a partial update of the original picture.

DESCRIPTION OF THE INVENTION

FIG. 1A diagrammatically shows the track on a compact disc. A packet is present in each of the successive sectors between two consecutive points a, b, c, d, e, etc. The structure of such a packet is diagrammatically shown in FIG. 1B. The packet comprises a total of 2352 bytes and is partitioned into a packet header H consisting of 24 bytes and a data field D consisting of 2328 bytes.

The packet header H is also divided into a synchronisation field S of 12 bytes, a first auxiliary field EH of 4 bytes and a second auxiliary field TH of 8 bytes. The synchronisation field S indicates the beginning of a packet. It comprises one byte consisting exclusively of "0" bits followed by 10 bytes consisting exclusively of "1" bits and finally again one byte consisting exclusively of "0" bits. The bits in the first auxiliary field EH indicate the ordinal number of the packet in the track. The second auxiliary field TH indicates whether the packet is a video packet, an audio packet or a computer data packet.

The data field D is divided into data slots DS. For an audio packet these data slots are chosen to be such that each of them can accommodate one 16-bit audio word of a digital audio signal. For a video packet these data slots are chosen to be such that each of them can accommodate one 8-bit video word of a digital video signal. Also for computer data packets, these data slots have a length of one byte.

As already described in the foregoing, each picture is divided into an array of 280×384 picture elements A(i, k). Here i (=1, 2, ..., 280) is the ordinal number of the line and k (=1, 2, ..., 384) is the ordinal number of the picture element on this line (column). When an eight-bit video word (or byte) Q(i,k) is transmitted for each picture element A(i,k), the transmission of an entire picture requires approximately 47 video packets each including 2328 bytes.

At the receiver shown diagrammatically in FIG. 2, the compact disc 1 is read with a reading device 2. This device converts the information from the disc into electric signals which are applied to a demultiplexer 3. Starting from the information in the second auxiliary field, this demultiplexer supplies the computer data packets present on the disc to an output 3(1), the audio packets to an output 3(2) and the video packets to an output 3(3).

Since within the scope of the invention it is only important to have some insight into the further processing of the video packets, the processing of the audio and computer data packets will not be further described. The video packets are applied to a separation circuit 4 whose function will be explained hereinafter. At this point in the description it is sufficient to know that separation circuit 4 exclusively supplies the video words which are present in the video packet. These video words are applied to a picture memory 5. This memory has at least as many memory locations as there are picture elements into which the transmitted picture is partitioned. It will initially be assumed hereinafter that the number of memory locations is equal to the number of picture elements. The memory location whose content corresponds to the picture element A(i,k) will be indicated by 5(i,k). An addressing circuit 5(1) together with a write command W, ensures that an 8-bit video word Q(i,k) is written in each memory location 5(i, k) in the conventional manner via a memory input encoding circuit 5(2). The addressing circuit 5(1), together with a read command R, also ensures that the contents of the memory locations are non-destructively read in the correct sequence via a memory output decoding circuit 5(3). The video words Q(i, k) consecutively occurring at the output of decoding circuit 5(3) are applied to a converter circuit 6 which converts the video words into analogue video signals. These are in turn applied to a picture tube 7 which produces a visible image of the transmitted picture.

One drawback of the transmission method described so far is that 47 video packets must be transmitted whenever a different picture is desired. Particularly when the new picture differs only little from the actual picture, this is a waste of the transmission capacity of the disc. When only the changes which must be made in the actual picture to obtain the new picture are transmitted, then there will be a considerable savings in space on the compact disc. That space can then be utilized for other purposes. The change in the actual picture required to produce the new picture will be referred to as "updating" and the video words required for this purpose will be referred to as "updating video words".

Let it be assumed that 3200 picture elements of an actual picture must be updated. This means that a block of 3200 updating video words is to be transmitted This block is diagrammatically shown in FIG. 3A by the block UB. For transmission, this block is divided into a number of sub-blocks. In FIG. 3 these sub-blocks are denoted by I II, III, ... VIII. The sub-blocks comprise, for example, 100, 200, 300, 400, 500, 600, 700 and 400 bytes, respectively. An operational code (OPC) of, for example, 10 bytes is added to the beginning of each sub-block. A code word EOB also consisting of, for example, 10 bytes and indicating that the UB block has ended can be added to the end of the last sub-block, in this case sub-block VIII (EOB=end of block). The update transmission block UBT so obtained is shown diagrammatically in FIG. 3B. The length of the added operation codes and the code word EOB is not drawn to scale. However, it has been indicated that sub-block I is preceded by operational code $OPC_I$, sub-block II by $OPC_{III}$, etc. Due to the addition of the different operational codes and the code word EOB, the block UBT to be transmitted has a total length of 3290 bytes. Since this is more than 2328 bytes length of the data field in a video packet, the block UBT is divided into two parts. The first part comprises 2328 bytes and, as diagrammatically shown in FIG. 3C, it can be accommodated exactly in the data field of a video packet $P_n$. The remaining part, which comprises 962 bytes, is accommodated in the data field of a second video packet $P_{n+1}$. This packet thus comprises data slots for 1366 bytes which are not used for the transmission of video words and therefore all those bytes have a zero value.

As shown in FIG. 3D, the added operational codes OPC consist of an operation identifier OI of 2 bytes and a picture element indicator PELI of 8 bytes. The operation identifier indicates that picture elements of the actual picture must be renewed and it indicated whether, for example, the video words in the associated sub-block relate to consecutive picture elements of the same line, or whether it relates to, for example, picture elements of different, directly adjacent lines, which picture elements when combined constitute a rectangular block. The first four bytes of the picture element indicator PELI give the beginning coordinates i and k of the picture element to which the first updating video word in the sub-block relates. The last four bytes of the picture element indicator PELI given the coordinates i and k of the picture element to which the last updating video word in the sub-block relates.

The updating block UBT transmitted in the manner described above and shown in FIG. 3B is applied to the separation circuit 4 of the receiver shown in FIG. 2. This circuit applies the operational codes OPC to the addressing circuit 5(1) and the updating video words following an operational code to the memory input encoder 5(2). The addressing circuit 5(1) addresses memory locations of the memory 5 in a sequence determined by the operation identifier OI from the memory location with the beginning coordinates given by the picture element indicator (PELI) to the memory location with the end coordinates given by the picture element indicator PELI. The above-mentioned addressing sequence may be, for example, in accordance with a straight line or a rectangle.

It is to be noted that the division of the block UB shown in FIG. 3A is a result of the fact that the number of possible operation identifiers OI is limited. The division into sub-blocks is therefore such that each sub-block comprises the video information words which are associated with picture elements which are related to each other in a manner which can be defined by one operation identifier. For example, they are located contiguously on one and the same picture line or they are located contiguously in a rectangle. This means that if all video words of the block UB are related to each other in a manner which can be defined by one operation identifier, the previously described partition of this block UB can be dispensed with. It is then sufficient to add one operational code to the beginning of the block. In the extreme case this block comprises the video words for all picture elements of a picture which is therefore entirely renewed.

The above means that the transmission of a block of video words always begins with an operational code, which opertional code is located immediately after the packet header of the first packet in which a part of the block is accommodated.

The question which can now be asked is how does the receiver detect that a given packet begins with an operational code. This is signaled by a part of the bytes in the second auxiliary field, more specifically by, for example, the last two bits in this second auxiliary field. If the next to last bit is, for example, "1", then the data field begins with an operational code. If this bit is "0", then the data field immediately begins with video words. If the last bit of the second auxiliary field is a "1", then this means that the data field comprises an EOB code. If such a code is not present in the data field, then the last bit of the second auxiliary field is a "0".

Particularly in the case of a partial updating of the picture there is a special problem if, as has been assumed in the foregoing, the video pictures are transmitted in a DPCM format. This special problem will be described with reference to FIGS. 4A to 4G. FIG. 4A diagrammatically shows a number of consecutive picture elements which are indicated by the reference numerals 100, 101, 102, . . . 120, respectively. Let it be assumed that these picture elements have a luminance whose value is characterized by the height of the lines indicated in FIG. 4B. The video words which are representative of the difference between the luminances of each pair of consecutive picture elements are now transmitted, and stored in the memory locations of the memory 5. These differences are diagrammatically shown in FIG. 4C. Let it be assumed that for the picture elements marked x in FIG. 4A, the updated luminances must be changed to the values indicated at FIG. 4D. This means that for these picture elements video words must be transmitted which are representative of the luminance differences indicated in FIG. 4E. Since the new luminance of the picture element 109 (see FIG. 4D) increased by the original difference luminance (FIG. 4C) applicable to the picture element 110 does not lead to the luminance of element 110 shown in FIG. 4B, the difference luminance for picture element 110 must be adapted to the new luminance of element 109 and therefore also the video word applying to this picture element 110 must be so adapted. This adaptation is also shown in FIG. 4E. Since the luminance differences are encoded by only 4 bits, such a difference cannot be more than sixteen steps. If the difference is more than sixteen steps the adaptation of the renewed part to the original picture must be spread over a number of picture elements. For the sake of completeness this is indicated in FIGS. 4F and 4G. The desired new luminances of the picture elements 104 through 109 shown in FIGS. 4F, and 4G indicate the luminance differences. More particularly, the transitional luminance differences are marked by O in FIG. 4G.

It has been described in the foregoing that certain parts of the picture memory can be renewed by using the operation identifier OI. Thereafter, the picture memory is read in accordance with a fixed pattern, namely line after line and memory location after memory location and beginning with the memory location with the coordinates i=1, k =1. With the aid of a suitably chosen operation identifier OI it can, however, also be indicated that the reading operation should start with a different memory location. If this different memory location has the coordinates $i_o$, 1, the term vertical scrolling is sometimes used. If it has the coordinates 1, $k_o$ the term horizontal scrolling, is sometimes used.

In the case of vertical scrolling the memory locations in the lines 1 through io are read last and thus they constitute the last lines of the picture. In the case of horizontal scrolling the memory locations 1 through $k_o$ of each line are not read until memory locations $k_o+1$ through 384 have been read. Thus they constitute the last picture elements of the corresponding picture line.

The operation identifier OI also comprises an update operation for replacing the contents of the memory locations in the lines 1 through $i_o$ in the case of vertical scrolling and of the memory locations in the columns 1 through $k_o+1$ in the case of horizontal scrolling by the video words which are incorporated in the data field.

It is to be noted that it is conventional practice to transmit each time the first picture element of a line in a PCM format in the transmission of video signals in a DPCM format. In the case of horizontal scrolling, the DPCM words in the memory locations 5(i, $k_o+1$) (i=1, 2, . . . 288) are then replaced by PCM words.

What is claimed is:

1. An apparatus for reproducing an updated image of a video picture represented by information stored on a record carrier, respective regions of such record carrier being adapted to store respective packets of digital information words, the information words in each packet respectively corresponding to respective picture elements of said video picture, the information word for a picture element signifying a replacing value of one or more video characteristic thereof in order to update it to correspond to said updated image of said picture; the information words in each packet being partitioned into one or more sub-blocks of information words, each such sub-block relating to contiguous picture elements forming one of different identifiable geometric patterns in said updated image, a majority of such picture elements being those which are to be updated by information words relating thereto in such sub-block; each sub-block being prefixed by an operational code including a first code identifying the geometric pattern formed by the picture elements to which such sub-block relates and a second code identifying the position of said pattern in said updated image; said apparatus comprising:

means for reading from said record carrier the information words stored thereon;

a memory having a plurality of addressable memory locations, each memory location corresponding to a respective one of said picture elements and being adapted to store the information word corresponding to such picture element;

means for separating said operation code from each of said sub-blocks of information words read from said record carrier;

addressing means responsive to the operational code of a sub-block for storing the information words in such sub-block respectively in the respective locations in said memory for the picture elements corresponding to such information words;

means for reading-out the information words stored in said memory locations;

a video display comprising picture elements therein corresponding to the picture elements in said video picture; and means responsive to said read-out information words for updating the picture elements corresponding thereto in said video display in accordance with such information words.

2. The apparatus according to claim 1, wherein said information words of at least one of said sub-blocks are associated with contiguous picture elements forming a segment of a scanning line of said updated image, and said operational code identifies the first and the last picture elements on said segment and the sequence of picture elements there-between which are to be updated by the information words in such sub-block.

3. The apparatus according to claim 1 or 2 wherein the information word corresponding to a picture element represents the difference between one or more of said charcteristics of such picture element and the same characteristics of an adjoining picture element.

4. The apparatus according to claim 3 wherein one of said characteristics is the luminance of each of said adjoining picture elements.

5. The apparatus according to claim 1 or 2 wherein the last sub-block of a packet includes an end of block code.

6. The apparatus according to claim 1 wherein said picture elements of said picture are arranged in rows and columns, said operational code identifies picture element by row and column number thereof and wherein said memory has a memory location associated with each picture element of said picture.

7. The apparatus according to claim 1 wherein one or more of said packets of digital information words further store digital signals representing sound; each packet having a header which indicates whether that packet contains a signal representing sound or a signal representing a picture; and further including means for directing packets which contain signals representing pictures to said separating means.

8. The apparatus according to claim 1, wherein said information words of at least one of said sub-blocks are associated with contiguous picture elements on successive scanning lines of said updated image, such elements forming a rectangular pattern in such image; and said operational code identifies the first picture element on the first line of said pattern, the last picture element on the last line of said pattern, and the sequence of picture elements in said pattern corresponding to the information words in said sub-block.

9. A method of storing in a digital memory the video values of the pixels in each of successive images of a video picture, each pixel having the same positional coordinates in each of said images and having video values in each image defined by digital video words applicable to such pixel in such image, such method comprising:

(a) determining the video words of all pixels in an initial image of said picture, and storing the video words for said initial image in one sector of said digital memory;

(b) determining the video words of all pixels in a next succeeding image of said picture, and identifying those of such pixels for which the video words applicable thereto in said succeeding image are updated from those in said initial image;

(c) forming one or more sub-groups of the video words applicable to pixels in said succeeding image, each such sub-group being for pixels which form one of different identifiable geometric patterns in such image, a majority of such pixels being those which are updated in said succeeding image;

(d) prefixing each of said sub-groups of video words with an operational code including a first code identifying the geometric pattern formed by the pixels to which such sub-group relates and a second code identifying the positional coordinates of pixels therein which define said pattern in said succeeding image;

(e) storing said prefixed sub-groups of video words in another sector of said digital memory; and (f) repeating steps (b)–(e) for further succeeding images of said video picture, in each case treating the initial image referred to in step (a) as the image of said video picture immediately preceding the succeeding image thereof referred to in step (b).

10. A method as claimed in claim 9, wherein said geometric pattern formed in an image by the pixels to which a sub-group relates is any of a scanning line of said image, a segment of a scanning line, a rectangle formed by successive scanning lines, or a rectangle formed by segments of successive scanning lines.

11. A method as claimed in claim 9 or 10, further comprising forming the video words applicable to successive pixels by differential pulse code modulation.

12. A method as claimed in claim 9, wherein the video words applicable to any image of said picture are stored as a group in one sector of an optically readable compact disc, and the successive groups of video words applicable to successive images of said picture are stored in successive sectors of said compact disc.

13. A record carrier having information storage tracks thereon, successive groups of video words being stored in successive sectors of said tracks, said groups representing successive video images of a video picture formed by a plurality of pixels of said video picture, each pixel having the same positional coordinates in each of said images and having picture values in each image defined by a video word applicable to such pixel in the group of video words corresponding to such image; an initial one of said groups of video words being for all pixels in an initial image of said picture and each succeeding group being for pixels in a succeeding image thereof, each such succeeding group being divided into one or more sub-groups, each such sub-group comprising:

(a) video words applicable to pixels which form one of different identifiable geometric shapes in the image of said picture to which said succeeding group relates, a majority of such pixels being those for which the video words applicable thereto in such image are updated from those applicable thereto in the immediately preceding image of said picture; and (b) a prefix operational code for said sub-group including a first code identifying the geometric shape formed by the pixels therein and a second code identifying the positional coordinates of pixels therein which define said geometric shape;

the operation code and video words of each sub-group of each of said groups of video words being readable from said record carrier so as to produce a video display of the successive images of said picture corresponding to said successive groups of video words, each such image being formed by modifying the picture values of the pixels in the immediately preceding image in accordance with the video words applicable to pixels in the geometric shapes to which such video words relate.

* * * * *